United States Patent [19]
Modisette et al.

[11] 3,839,914
[45] Oct. 8, 1974

[54] METHOD AND APPARATUS OF DETERMINING THE DENSITY, VELOCITY AND VISCOSITY OF FOLLOWING FLUIDS

[75] Inventors: Jerry Lee Modisette; Morris T. Covington, both of Houston, Tex.

[73] Assignee: Taft Broadcasting Corporation, Houston, Tex.

[22] Filed: Jan. 2, 1973

[21] Appl. No.: 320,488

[52] U.S. Cl. .................................. 73/438, 73/155
[51] Int. Cl. .......................................... G01n 9/26
[58] Field of Search...................... 73/438, 32, 155

[56] References Cited
UNITED STATES PATENTS
2,768,529  10/1956  Hagler .............................. 73/438

*Primary Examiner*—Jerry W. Myracle
*Attorney, Agent, or Firm*—Joe E. Edwards; Julian Clark Martin

[57] ABSTRACT

A method and apparatus for continuously and simultaneously determining the density, velocity and Fanning friction factor, and thus the viscosity, of a flowing fluid. The fluid is caused to flow through a conduit having a curved portion. Pressure transducers positioned in the curved portion of the conduit determine the difference in pressure between the fluid adjacent the inside and the outside of the curved portion of the conduit. Additional pressure transducers are positioned in the conduit at selected, equal distances upstream and downstream of the transducers located in the curved portion of the conduit. The differences in pressure in the fluid between these upstream and downstream locations and between the upstream and downstream locations and the curved portion of the conduit are determined. These pressure determinations are utilized in equations according to this invention to determine the desired parameters of density, flow velocity and viscosity.

22 Claims, 6 Drawing Figures

PATENTED OCT 8 1974
3,839,914
SHEET 1 OF 2

METHOD AND APPARATUS OF DETERMINING THE DENSITY, VELOCITY AND VISCOSITY OF FOLLOWING FLUIDS

BACKGROUND OF THE INVENTION

This invention relates to a method and apparatus for simultaneously and continuously measuring and determining the density, flow velocity and Fanning friction factor, and thus the viscosity, of a flowing fluid. This invention has particular application to the measurement and determination of the density, flow velocity and Fanning friction factor, and thus the viscosity, of drilling fluid (mud) as it flows from the mud pumps to a well or out of the well.

In most situations involving a flowing fluid, it is desirable to measure one or more of the parameters of density, flow velocity and viscosity of the fluid. These parameters are valuable for numerous reasons. For instance, continuous monitoring of the density and flow velocity of drilling fluid allows one to detect rapidly blow outs and washouts.

Other attempts have been made to measure simultaneously and continuously one or more of the parameters of density, velocity and viscosity of a flowing fluid. For example, the following U.S. Pats. have issued relating to the problem: 1,963,011; 2,057,767; 2,287,027; 3,175,403; 3,251,226; 3,286,510; 3,363,453; 3,468,158; 3,469,446; 3,473,368; and 3,554,009. For one reason or another, each of these prior methods and apparatus is disadvantageous or fails to accomplish the objectives accomplished by this invention.

The method and apparatus according to this invention comprises flowing a fluid through a conduit which provides a selected path for the fluid, including a path which flows around a curve. The pressure of the flowing fluid is determined at a first point on the inside and a second point on the outside of the path of the fluid as it flows around the curve. The pressure of the flowing fluid is also determined at points upstream and downstream of the first and second pressure points. The upstream and downstream pressure points are located a selected, equal distance from the first and second pressure points. The four pressure determinations are utilized to solve formulae according to this invention which yield the density, flow velocity and Fanning friction factor, and thus the viscosity, of the flowing fluid.

It is an object of this invention to provide an improved method and apparatus for determining the density, velocity and Fanning friction factor, and thus the viscosity, of a flowing fluid which is capable of yielding an accurate, continuous and simultaneous determination of such parameters.

It is an object of this invention to provide an improved method and apparatus for determining the density, velocity and Fanning friction factor, and thus the viscosity, of a flowing fluid which is operable with any fluid, whether liquid or gas, flowing through a conduit having a pressure, whether it be by gravity or otherwise, sufficient to fill the volume of the conduit.

It is an object of this invention to provide an improved method and apparatus for determining the density, velocity and Fanning friction factor, and thus the viscosity, of a flowing fluid which is operable with both laminar flow and turbulent flow.

It is an object of this invention to provide an improved method and apparatus for determining the density, velocity and Fanning friction factor, and thus the viscosity, of a flowing fluid wherein there is no apparatus protruding into the fluid to impede the flow thereof.

It is an object of this invention to provide an improved method and apparatus for determining the density, velocity and Fanning friction factor, and thus the viscosity, of a flowing fluid wherein the fluid may freely flow through a conduit of substantial size and there are no sharp turns or orifices to impede the flow of the fluid.

It is an object of this invention to provide an improved method and apparatus for determining the density, velocity and Fanning friction factor, and thus the viscosity, of a flowing fluid wherein the conduit through which the fluid flows may be connected directly into the operating line, such as between the mud pumps and the well, and the desired determinations made during normal operations.

It is an object of this invention to provide an improved method and apparatus for determining the density, velocity and Fanning friction factor, and thus the viscosity, of a flowing fluid which is less expensive, sturdier, easier to maintain, simpler and more accurate than existing methods and apparatus.

BRIEF DESCRIPTION OF THE DRAWINGS

The invention itself, both as to organization and method of operation, as well as additional objects and advantages thereof, will become readily apparent from the following description when read in connection with the accompanying drawings, in which like numerals represent like parts.

DESCRIPTION OF THE INVENTION

Figure 1:
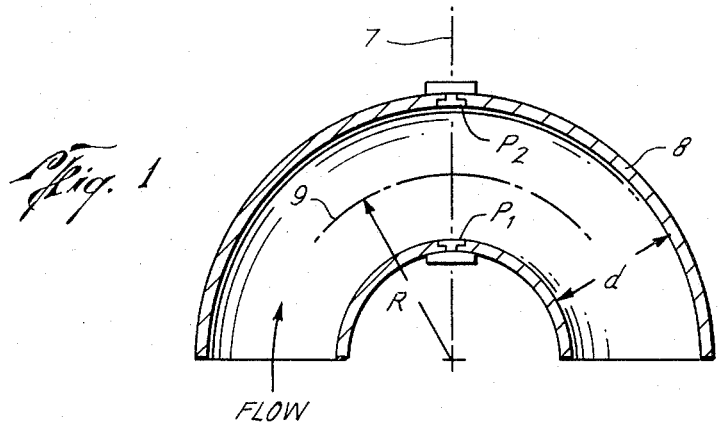
FIG. 1 is a schematic sectional view of the curved portion of a conduit according to this invention.

In flowing a fluid, whether it be liquid or gas, through a curved conduit having a constant cross-sectional area under pressure sufficient to fill the entire volume of the conduit, the difference in pressure between the fluid flowing against the inner point of the curved conduit and the outer point of the curved conduit is proportional to the square of the flow velocity of the fluid and the difference in elevation between the inner and outer points of the curved conduit. Particularly, as illustrated in FIG. 1, the difference in pressure between two points $P_1$ and $P_2$, each of which is located in a plane 7 normal to the conduit 8 in the curved portion thereof, is proportional to the square of the flow velocity of the fluid plus the hydrostatic pressure of the fluid between the two points, as follows:

$$P_2 - P_1 = Pv^2d/r + pgb$$

1.

where $p$ is the density of the fluid, $d$ is the diameter of the conduit 8, $r$ is the radius of the curvature of the centerline 9 of the curve, $g$ is gravity, and $b$ is the difference in elevation between $P_1$ and $P_2$.

In flowing a fluid through a conduit having a constant cross-sectional area under pressure sufficient to fill the entire volume of the conduit, the difference in pressure between any two given points in the fluid is a function of the viscosity of the fluid and the difference in elevation between the two points. Particularly, the difference in pressure between two given points $P_4$ and $P_3$ in the fluid equals the viscous losses of the fluid between the two points plus the hydrostatic pressure of the fluid between the two points, as follows:

$$P_4 - P_3 = \Delta P_{viscosity} + pgh$$

2.

Figure 2:
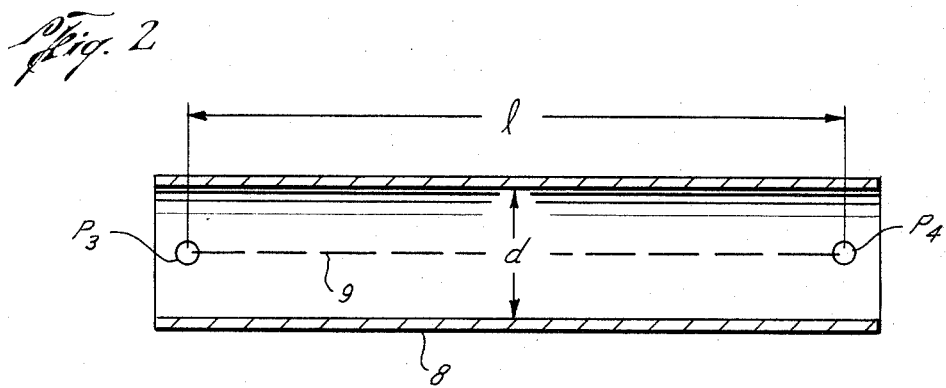
FIG. 2 is a schematic sectional view of a straight section of conduit.

As illustrated in FIG. 2, if $P_4$ and $P_3$ are at the same elevation, $h$ equals zero and there is no hydrostatic pressure difference between $P_4$ and $P_3$; all of the difference in pressure between the two points is then due to the viscous loss.

The viscous loss between any two points in the fluid is defined by the equation:

$$\Delta P \text{viscosity} = 2flpv^2/dg$$

3.

where, as illustrated in FIG. 2, $l$ is the length of the conduit 8 measured along its centerline 9 between the two points, and $d$ is the diameter of the conduit. The Fanning friction factor, $f$, is directly related to the viscosity of the fluid through its dependence on the Reynolds number, $Re$, of the fluid. Thus, knowledge of $f$, the Fanning friction factor, allows one skilled in the art to determine the viscosity, $\mu$, of the fluid simply by referring to any of numerous well known charts correlating the Fanning friction factor with the Reynolds number.

Figure 3:
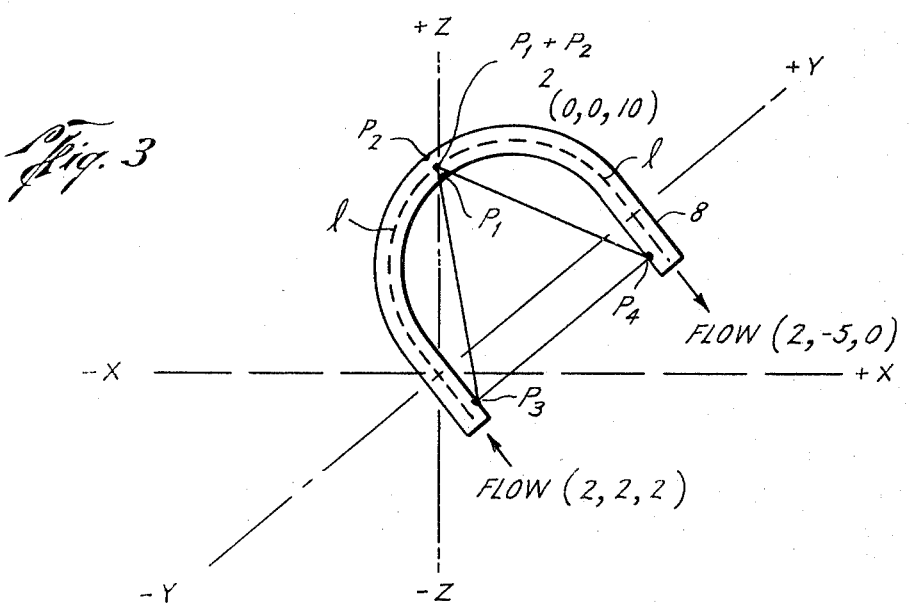
FIG. 3 is a schematic view of a conduit according to this invention superimposed on a set of X, Y, Z coordinates and with $P_1$, $P_2$, $P_3$ and $P_4$ located in the conduit.

FIG. 3 illustrates a conduit constructed according to this invention such that it includes a curved portion in which first and second pressure transducers $P_1$ and $P_2$ are positioned as discussed above so as to allow the use of equation (1). $(P_1 + P_2)/2$ yields the average pressure of the fluid between these points. The conduit extends from the location of $P_1$ and $P_2$, that is, from the plane through $P_1$ and $P_2$ normal to the conduit, a selected distance both upstream and downstream, and an additional pressure transducer, $P_3$ and $P_4$ respectively, is positioned along each of the extended legs of the conduit. The distance $l$ through the center of the conduit between the plane through $P_3$ normal to the path of the conduit and the plane through $P_1$ and $P_2$ normal to the path of the conduit is equal to the distance $l$ along the center of the conduit between the plane through $P_4$ normal to the path of the conduit and the plane through $P_1$ and $P_2$ normal to the path of the conduit. The portion of the conduit in which each of $P_3$ and $P_4$ is positioned preferably is straight so there are no pressure differences in the plane through each point normal to the conduit due to differences in the velocity of the fluid moving through the plane. And the portion of the conduit in which each of $P_3$ and $P_4$ is positioned preferably is vertical so there will exist no differences in the plane through the pressure point normal to the conduit due to the differences in the elevation of the fluid in the plane. In either case, if there are sufficient pressure differences in the planes in which $P_3$ and $P_4$ are situated to produce errors in the determinations, then a second pressure point may be utilized in each plane (as in the case of $P_1$ and $P_2$) and the mean pressure of the plane determined. Additionally, the plane defined by the midpoint between $P_1$ and $P_2$, and the two points $P_3$ and $P_4$, may not be horizontal.

In accordance with the theory supporting equation (2), the pressure $P_1$, $P_2$, $P_3$ and $P_4$ of the fluid flowing through the conduit illustrated in FIG. 3 and constructed in accordance with this invention are related to the density and flow velocity of the fluid as follows:

$$P_4 - (P_1 + P_2)/2 = -pgh_2 + \Delta P \text{viscosity (½conduit)}$$

4.

$$(p_1 + P_2)/2 - P_3 = pgh_1 + \Delta P \text{viscosity (½conduit)}$$

5.

In each of the equations (4) and (5), viscosity is only half of the total viscous losses of the fluid between $P_4$ and $P_3$, that is, only half of the viscous losses through the entire length of the conduit. Summing equations (4) and (5) yields the total pressure difference between points $P_4$ and $P_3$ in terms of the total viscous losses of the conduit and the hydrostatic pressure differences of points $(P_1 + P_2)/2$, $P_3$ and $P_4$ with respect to each other:

$$P_4 - P_3 = \Delta P \text{viscosity} + pg(h_1 - h_2)$$

where $h_1$ is the difference in elevation with respect to gravity between points $P_3$ and $(P_1 + P_2)/2$, and $h_2$ is the difference in elevation with respect to gravity between points $P_4$ and $(P_1 + P_2)/2$. If points $P_3$ and $P_4$ are located in the same elevation, the element of the formula dependent on the hydrostatic pressure differences between the pressure points becomes zero. In such case, the pressure difference between $P_4$ and $P_3$ is due solely to the viscous losses of the fluid in the conduit, irrespective of the path followed by the conduit, so long as the length between $(P_1 + P_2)/2$ and $P_3$ is equal to the length between $(P_1 + P_2)/2$ and $P_4$:

$$P_4 - P_3 = \Delta P \text{viscosity} = 2flpv^2/d$$

6.

As stated above, equation (1) above is applicable to points $P_1$ and $P_2$ in the conduit illustrated in FIG. 3 and constructed according to this invention. If the conduit is oriented so that points $P_1$ and $P_2$ are located on the same elevation or the diameter of the conduit is sufficiently small to exclude erroneous determinations, the element of the formula dependent on the hydrostatic pressure differences between the points becomes zero:

$$P_2 - P_1 = pv^2d/r$$

Solving equations (4) and (5) for the density of the flowing fluid yields:

$$P = P_1 + P_2 - P_3 - P_4 / 2g(h_2 + h_1)$$
7.

Solving equation (1) for the flow velocity of the fluid yields:

$$V = \sqrt{r(P_2 - P_1 - pgb)/pd}$$
8.

and solving equation (6) for the Fanning friction factor of the following fluid yields:

$$f = (P_4 - P_3)d/2 \; lpv^2$$
9.

The Fanning friction factor, when compared with standard charts, yields the Reynolds number and thus the viscosity of the flowing fluid.

Thus in the conduit illustrated in FIG. 3 and constructed in accordance with this invention, the density of the flowing fluid is continuously determined accurately simply by monitoring the pressures of the flowing fluid at the points $P_1$, $P_2$, $P_3$ and $P_4$. The denominator of the equation (7) is a known constant for any particular embodiment of the invention. For example, in the conduit illustrated in FIG. 3, wherein the pressure points are assigned coordinates in an X, Y, Z coordinate system, $h_2 = 10$ and $h_1 = 8$.

Determination of the density of the flowing fluid allows the simultaneous determination of the flow velocity of the fluid in accordance with equation (8). $P_2$ and $P_1$ have previously been determined and all of the other elements of the equation are known quantities. Lastly, knowledge of the density and flow velocity of the fluid allows the simultaneous determination of the Fanning friction factor in accordance with equation (9) which again consists only of known quantities and previously determined values.

Figure 4:
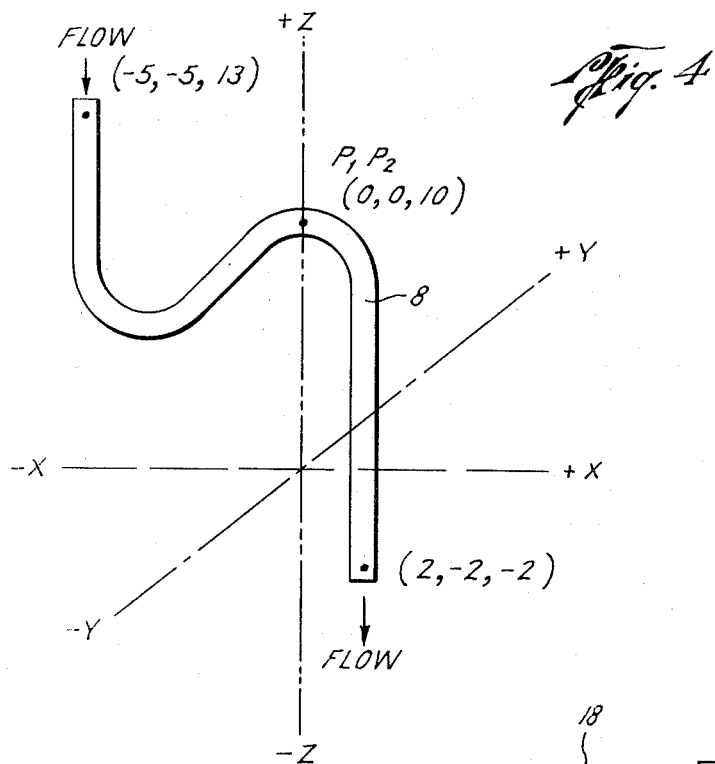
FIG. 4 is another schematic view of a conduit according to this invention superimposed on a set of X, Y, Z coordinates and with $P_1$, $P_2$, $P_3$ and $P_4$ located in the conduit.

The method and apparatus according to this invention provides for the simultaneous and continuous determination of the density, flow velocity and Fanning friction factor, and thus the viscosity, of any fluid flowing through a conduit having a curved portion, wherein the pressure of the flowing fluid is determined at a first point on the inside and a second point on the outside of the path of the fluid as it flows around the curve, and wherein the pressure of the flowing fluid is also determined at points upstream and downstream a selected, equal distance from the first and second points, and wherein the plane defined by the midpoint of the first and second points, and the upstream and downstream points, is not horizontal. For example, another conduit according to this invention providing an unusual path for the flowing fluid is illustrated in FIG. 4. The input pressure transducer $P_3$ is positioned near the input of the conduit at coordinates -5, -5, 13. The midpoint of pressure transducers $P_1$ and $P_2$ is located at coordinates 0, 0, 10. The output pressure transducer $P_4$ is located at coordinates 2, -2, -2. The length of the conduit from $P_3$ to the midpoint of $P_1$ and $P_2$ is equal to the length of the conduit from the midpoint of $P_1$ and $P_2$ to $P_4$, and the plane defined by points $P_3$, $P_4$ and the midpoint of $P_1$ and $P_2$ is not horizontal. Thus, continuous determination of the pressures of the flowing fluid at $P_1$, $P_2$, $P_3$ and $P_4$, when applied to the formulas (7), (8) and (9) according to this invention, will continuously and simultaneously yield the density flow velocity, and Fanning friction factor, and thus the viscosity, of the fluid. In the particular conduit illustrated in FIG. 4, $h_2 = 12$ and $h_1 = 3$.

Figure 5:
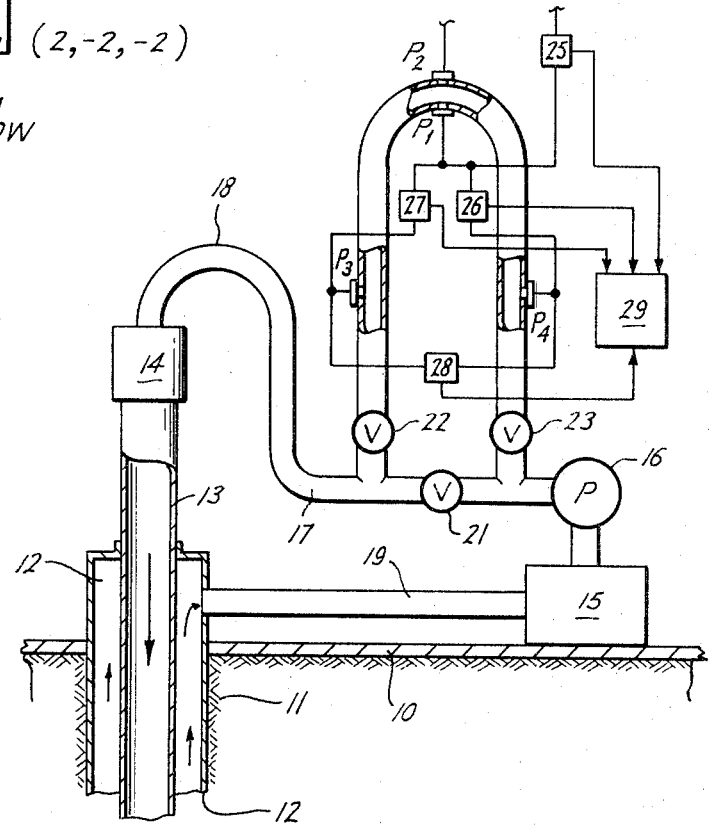
FIG. 5 is a schematic view of the preferred embodiment of this invention applied to a drilling mud operation.

The preferred embodiment of this invention applied to a typical well drilling apparatus involving the use of drilling mud is schematically illustrated in FIG. 5. Extending through the floor 10 of the drilling rig and into the earth 11 is the casing 12. Extending downwardly into the casing 12 is the drill string 13. The drill string is suitably supported by a swivel 14 and other attendant equipment well known to those skilled in the art. Mud from the mud tank 15 is pumped by pump 16 through stationary conduit or pipe 17 through a flexible conduit or rubber hose 18 and through swivel 14, into the drill string 13. The mud travels downwardly through the drill string to a drill bit (not shown) on the lower end of the drill string. The mud circulates out of the drill bit or the lower end of the drill string and travels upwardly through the annulus between the casing 12 and the drill string 13. At the surface, the mud is channeled from the annulus through a conduit or pipe 19 back to the mud tank 15.

The preferred apparatus for determining the density, flow velocity and viscosity of the flowing mud according to this invention comprises a shunt conduit 8 welded or otherwise secured to conduit 17. The flow of the mud is selectively diverted into the conduit 8 by opening valves 22 and 23 and closing valve 21. Once the conduit 8 is installed, it is preferable to maintain the flow of the mud therethrough so the desired parameters of the mud can be continuously determined.

Figure 6:
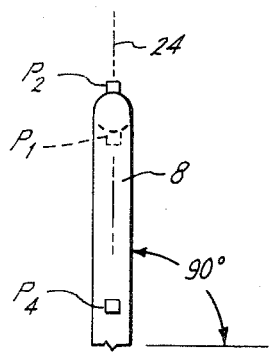
FIG. 6 is a side view of the preferred conduit according to this invention taken at line 6—6 in FIG. 5.

The preferred construction of the conduit 8 is U-shaped, that is, two vertical legs with a semicircular, curved portion therebetween. As illustrated in FIG. 6, the legs and the curved portion of the conduit preferably are aligned in the same vertical plane 24 (the plane 24 in FIG. 2 is normal to the paper) so that the flow of the mud is into the conduit, vertically upward, around the curved portion, vertically downward, and out of the conduit.

Attached to the conduit in fluid communication with the flowing mud are four devices for sensing the pressure of the flowing mud. These four devices are positioned with respect to the path of the flowing mud as has been previously described. Each of these pressure-sensing devices may be a pressure transducer, such as is familiar to those skilled in the art, which generates an electrical signal proportional to the pressure sensed by it. However, since the equations according to this invention require only the difference in pressure between given pressure points, the pressure-sensing devices preferably are four differential pressure transducers, each of which functions to sense only the difference in pressure between two given points and generate an electrical signal proportional thereto. Each of these differential pressure transducers may be any of numerous, commercially available devices well known to those skilled in the art, such as a Consolidated Controls Corporation LVDT Model 41GP14.

As illustrated in FIGS. 5 and 6, the pressure taps for the first differential pressure transducer 25 are placed in fluid communication with the flowing mud so as to sense the pressure of the mud at a first point ($P_1$) adjacent the inside of the curved section of the conduit and at a second point ($P_2$) adjacent the outside of the curved section of the conduit. The first and second points $P_1$ and $P_2$ preferably are located vertically with respect to each other at the apex of the semicircular curved section of the conduit. Although the diameter of the conduit and the radius of curvature of the curved section of the conduit may vary and are within the province of one skilled in the art, the preferred conduit according to this invention to be utilized with mud flowing at the rate of approximately 200 gallons per minute is 6 inches in diameter and includes a semicircular section having a 12 inch radius.

Located in the same vertical plane 24 as the first and second points $P_1$ and $P_2$ are the two additional pressure points $P_3$ and $P_4$. These two pressure points are preferably at the same elevation. Each of the pressure points $P_3$ and $P_4$ is located a selected, equal distance downwardly along the legs of the conduit from the midpoint between $P_1$ and $P_2$. In the preferred conduit according to this invention to be utilized with flowing mud, the distance from the midpoint between $P_1$ and $P_2$ to each of the planes normal to the conduit in which $P_3$ and $P_4$ is situated, measured along the center of the conduit, is six feet. Thus, the second differential pressure transducer 26 utilizes $P_1$ for one of its pressure taps and $P_4$ as its other pressure tap. The third differential pressure transducer 27 utilizes $P_2$ for one of its pressure taps and $P_3$ as its other pressure tap. As is evident from equation (7) according to this invention, the combination of the pressure taps for differential pressure transducers 26 and 27 may be reversed, that is, pressure tap $P_1$ be paired with $P_3$ and $P_2$ be paired with $P_4$. The fourth differential pressure transducer 28 utilizes $P_3$ as one of its pressure taps and $P_4$ as the other of its pressure taps.

The electrical signals generated by differential pressure transducers 25, 26, 27 and 28, proportioned to the pressure differences sensed between the various pairings of the pressure points $P_1$, $P_2$, $P_3$ and $P_4$, are coupled to the input of a general purpose digital computer programmed to solve the following equations or an analog apparatus 29 for electrically solving the following equations:

$$p = (P_1 - P_4) + (P_2 - P_3)/2gh \qquad 10.$$

$$v = \sqrt{r(P_2 - P_1 - \rho g d)/\rho d} \qquad 11.$$

$$f = (P_4 - P_3)d/2l\rho v^2 \qquad 12.$$

It is believed that the state of the art of programming a general purpose digital computer and the skill of the artisans is sufficiently sophisticated such that a program for solving the equations (10), (11) and (12) need not here be described. Furthermore, the knowledge of the electronic art and the skill of the artisans has developed to the level that the electronic analog apparatus 29 need not here be described. There are numerous analog structures 29 well known to those skilled in the art which will accurately solve the desired equations. It is within the skill of the artisan to construct an analog apparatus 29 which, when combined with the commercially available differential pressure transducers, will detect and resolve a pressure difference in the magnitude of one-tenth pound between two given points in a fluid flowing under a pressure of two thousand pounds. This degree of resolution will allow the accurate determination of the density to within ± 1 per cent, flow velocity to within ± 2 per cent, and viscosity of the fluid to within ± 5 per cent.

The apparatus will, of course, also detect the transient pressure changes in the fluid caused by such devices as the mud pumps. In order to eliminate the unwanted transient changes in the pressure of the fluid, the analog apparatus 29 may include elements to filter out the portions of the electrical signals generated by the differential pressure transducers having frequencies in excess of a selected magnitude. Since the frequencies of the electrical signals generated by the differential pressure transducers proportional to the pressure differences caused by the density, flow velocity and Fanning friction factor of the fluid are less than 10 Hertz and almost all other transient pressure changes exceed 10 Hertz, the preferred analog apparatus filters out electrical signals with frequencies in excess of 10 Hertz.

Thus the improved method and apparatus according to this invention provides for the accurate, simultaneous and continuous determination of the density, flow velocity and Fanning friction factor, and hence the viscosity, of any flowing fluid simply by monitoring pressures differences in the fluid and without impeding the flow of the fluid. It will now be apparent to those skilled in the art that the foregoing disclosure and description of the invention are illustrative and explanatory thereof, and various changes may be made in the construction of the improved apparatus according to this invention within the scope of the appended claims without departing from the spirit of the invention.

What is claimed is:

1. A method of determining the density, velocity and Fanning friction factor of a flowing fluid, including the steps of:

flowing the fluid in a conduit along a selected path having a curved portion, determining the pressure of the flowing fluid at a first point on the inside of the flow path of the fluid around the curved portion of the conduit at a selected location in the curved portion of the conduit;

determining the pressure of the flowing fluid at a second point on the outside of the flow path of the fluid around the curved portion of the conduit at the selected location in the curved portion of the conduit;

determining the pressure of the flowing fluid in the conduit at a third point a selected distance upstream from said selected location in the curved portion of the conduit;

determining the pressure of the flowing fluid in the conduit at a fourth point a distance downstream from said selected location in the curved portion of the conduit equal to the distance between said selected location in the curved portion of the conduit and the third point; and determining the density, velocity and Fanning friction factor of the fluid in accordance with the following equations (7), (8) and (9):

$$p = P_1 + P_2 - P_3 - P_4/2g(h_2 + h_1)$$

7.

$$V = \sqrt{r(P_2 - P_1 - pgb)/pd}$$

8.

$$f = (P_4 - P_3)d/2lpv^2$$

9.

2. A method of determining the density and velocity of a flowing fluid, including the steps of:
  flowing the fluid though a conduit providing a selected, defined path for the fluid, including a curved portion;
  determining the difference in pressure between a first point in the fluid adjacent the inside of the curved portion of the conduit and a second point in the fluid adjacent the outside of the curved portion of the conduit, the first and second points being positioned at a selected location in the curved portion of the conduit;
  determining the difference in pressure between the first point in the fluid and a third point in the fluid a selected distance upstream in the conduit from the selected location in the curved portion of the conduit;
  determining the difference in pressure between the second point in the fluid and a fourth point in the fluid a selected distance downstream in the conduit from the selected location in the curved portion of the conduit equal to the distance between the third point in the fluid and the selected location in the curved portion of the conduit;
  the plane defined by the midpoint between the first and second points, the third point, and the fourth point not being horizontal; and
  determining the density and velocity of the flowing fluid in accordance with the equations (7) and (8).

3. The method according to claim 2, wherein the Fanning friction factor of the flowing fluid is also determined, including the additional steps of:
  determining the difference in pressure between the third point in the fluid and the fourth point in the fluid; and
  determining the Fanning friction factor of the flowing fluid in accordance with the equation (9).

4. A method of determining the density, velocity and viscosity of a flowing fluid, including the steps of:
  flowing the fluid in a conduit vertically upwardly, around a semi-circular curve, and vertically downwardly;
  determining the pressure of the flowing fluid at a first point on the inside of the flow around the semi-circular curved portion of the conduit in a plane passing through the apex of the curved portion of the conduit;
  determining the pressure of the flowing fluid at a second point on the outside of the flow of the fluid around the semi-circular curved portion of the conduit in said plane in which the first point is located;
  determining the pressure of the flowing fluid at a third point in the portion of the conduit in which the flow of the fluid is vertically upwardly and at a selected distance from the plane in which the first and second points are located;
  determining the pressure of the flowing fluid at a fourth point in the portion of the conduit in which the flow of the fluid is vertically downwardly and at a selected distance from the plane in which the first and second points are located equal to said distance from the plane to the third point; and
  determining the density, velocity and Fanning friction factor of the flowing fluid in accordance with the following equations (7), (8) and (9):

$$p = P_1 + P_2 - P_3 - P_4/2g(h_2 + h_1)$$

7.

$$V = \sqrt{r(P_2 - P_1 - pgb)/pd}$$

8.

$$f = (P_4 - P_3)d/2lpv^2$$

9.

5. An apparatus for determining the density and velocity of a flowing fluid, including:
  a conduit having a curved section providing a path for the fluid;
  means secured to the conduit for determining the pressure of the flowing fluid at a first point adjacent the inside of the curved section of the conduit at a selected location in the curved section of the conduit and generating an electrical signal proportional to the pressure;
  means secured to the conduit for determining the pressure of the flowing fluid at a second point adjacent the outside of the curved section of the conduit at the selected location in the curved section of the conduit and generating an electrical signal proportional to the pressure;
  means secured to the conduit for determining the pressure of the flowing fluid at a third point in the conduit a selected distance upstream from the selected location in the curved section of the conduit and generating an electrical signal proportional to the pressure; and
  means secured to the conduit for determining the pressure of the flowing fluid at a fourth point in the conduit a selected distance downstream from the selected location in the curved section of the conduit equal to said distance between the third point and the selected location in the curved section of the conduit and generating an electrical signal proportional to the pressure;
  the plane defined by the midpoint between the first and second point, the third point, and the fourth point not being horizontal.

6. An apparatus according to claim 5 including means coupled to the outputs of the pressure transducers for utilizing the electrical signals generated by the pressure transducers to determine the density and velocity of the fluid in accordance with the following equations (7) and (8):

$$p = P_1 + P_2 - P_3 - P_4/2g(h_2 + h_1)$$

7.

$$V = \sqrt{r(P_2 - P_1 - pgb)/pd}$$

8.

7. An apparatus according to claim 6 for also determining the viscosity of the flowing fluid wherein the means coupled to the outputs of the pressure transducers includes means for determining the Fanning friction factor in accordance with the following equation (9):

$$f = (P_4 - P_3)d/2lpv^2 \text{ tm } 9.$$

8. An apparatus for determining the density, velocity and viscosity of a flowing fluid comprising:
   an elongated, generally U-shaped shunt conduit through which the fluid flows, the conduit providing for the fluid a path which is vertically upward, around a semi-circular curve, and then vertically downward;
   a first pressure transducer secured to the conduit for detecting the pressure of the flowing fluid at a first point on the inside of the curved portion of the conduit and generating an electrical signal proportional thereto;
   a second pressure transducer secured to the conduit for detecting the pressure of the flowing fluid at a second point on the outside of the curved portion of the conduit and generating an electrical signal proportional thereto;
   a third pressure transducer secured to the conduit for detecting the pressure of the flowing fluid at a third point in the section in which the flow of the fluid is upward at a selected distance from the first and points in the curved portion in the conduit and generating an electrical signal proportional thereto;
   a fourth pressure transducer secured to a conduit for detecting the pressure of the flowing fluid at a fourth point in the section in which the flow of the fluid is downward at a distance from the first and second points and the third pressure transducer; and
   means connected to the outputs of the first, second, third and fourth pressure transducers for determining the density, velocity and Fanning friction factor of the flowing fluid in accordance with the following equations (7), (8) and (9):

$$p = P_1 + P_2 - P_3 - P_4/2g(h_2 + h_1)$$
7.

$$V = \sqrt{r(P_2 - P_1 - pgb)/pd}$$
8.

$$f = (P_4 - P_3)d/2lpv^2$$
9.

9. An apparatus for determining the density and velocity of a flowing fluid, comprising:
   a conduit providing a path for the fluid, the conduit having a curved portion;
   means connected to the conduit for determining the difference in pressure between a first point in the portion of the fluid flowing adjacent the inside of the curved section of the conduit and a second point in the portion of the fluid flowing adjacent the outside of the curved section of the conduit, said first point and said second point being located in the selected plane in the curved section of the conduit;
   means connected to the conduit for determining the difference in pressure between said first point in the fluid and a third point in the fluid a selected distance upstream in the conduit from the selected location in the curved section of the conduit; and
   means connected to the conduit for determining the difference in pressure between said second point in the fluid and a fourth point in the fluid a selected distance downstream in the conduit from the selected location in the curved section of the conduit equal to said distance between the third point and the selected location in the curved section of the conduit;
   the plane defined by the midpoint between the fluid and second points, the third point, and the fourth point not being horizontal.

10. An apparatus according to claim 9 wherein each of the means connected to the conduit for determining the differences in pressure between points is a differential pressure transducer which generates an electrical signal proportional to the difference in pressure it detects.

11. An apparatus according to claim 10 including means coupled to the outputs of the differential pressure transducers for determining the density and velocity of the flowing fluid in accordance with the following equations (7) and (8):

$$p = P_1 + P_2 - P_3 - P_4/2g(h_2 + h_1)$$
7.

$$V = \sqrt{r(P_2 - P_1 - pgb)/pd}$$
8.

12. An apparatus according to claim 11 wherein the means for determining the density and velocity in accordance with the stated equations includes means for filtering those portions of the electrical signals generated by the differential pressure transducers exceeding a selected frequency.

13. An apparatus according to claim 9 for determining the Fanning friction factor of the following fluid in addition to the density and velocity of the flowing fluid, including:
   means connected to the conduit for determining the difference in pressure between the third point in the fluid and the fourth point in the fluid.

14. An apparatus according to claim 13 wherein each of the means for determining the difference in pressure between the third and fourth points is a differential pressure transducer.

15. An apparatus according to claim 14 including:
   means for filtering said electrical signals generated by the differential pressure transducers to obviate the portion of the signal having a frequency exceeding a selected magnitude; and
   analog means for applying the filtered electrical signals to and solving the following equations (7), (8) and (9) to determine the density, velocity and Fanning friction factor of the fluid:

$$p = P_1 + P_2 - P_3 - P_4/2g(h_2 + h_1)$$
7.

$$V = \sqrt{r(P_2 - P_1 - pgb)/pd}$$
8.

$$f = (P_4 - P_3)d/2lpv^2 \qquad 9.$$

16. In a hole boring system having an earth-engaging drilling bit, means for rotating and raising and lowering the drilling bit, a drilling fluid tank, and means for pumping and circulating the drilling fluid from the drilling fluid tank into the earth to the drilling bit and return, an apparatus for determining continuously and simultaneously the density and velocity of the flowing drilling fluid, comprising:
a conduit positioned in the circulating path of the drilling fluid, the conduit providing a selected flow path for the drilling fluid and including a curved position;
means secured to the conduit for determining the pressure of the drilling fluid at a first point adjacent the inside of the curved portion of the conduit at a selected location in the curved portion of the conduit;
means secured to the conduit for determining the pressure of the drilling fluid at a second point adjacent the outside of the curved portion of the conduit at the selected location in the curved portion of the conduit;
means secured to the conduit for determining the pressure of the drilling fluid at a third point a selected distance upstream in the conduit from the selected location in the curved portion of the conduit; and
means secured to the conduit for determining the pressure of the drilling fluid at a fourth point a selected distance downstream in the conduit from the selected location in the curved portion of the conduit equal to the distance between the selected location in the curved portion of the conduit and the third point;
the plane defined by the midpoint of the first and second points, the third point, and the fourth point, not being horizontal.

17. An apparatus according to claim 16 wherein each of the means for determining the pressure of the drilling fluid at a given point generates an electrical signal proportional to the determined pressure, and including:

means coupled to the outputs of the means for determining the pressure of the drilling fluid at given points for determining the density and velocity of the drilling fluid in accordance with the following equations (7) and (8):

$$p = P_1 + P_2 - P_3 - P_4/2g(h_2 + h_1) \qquad 7.$$

$$V = \sqrt{r(P_2 - P_1 - pgb)pd} \qquad 8.$$

18. An apparatus according to claim 16 for also determining the viscosity of the drilling fluid, including:

means coupled to the output of the means for determining the pressure of the drilling fluid at given points for determining the Fanning friction factor of the drilling fluid in accordance with the following equation (9):

$$f = (P_4 - P_3)d/2lpv^2 \qquad 9.$$

19. An apparatus according to claim 16 wherein:
the means for determining the pressures of the drilling fluid at the four given points are three differential pressure transducers which only determine the difference in pressure between the first and second points, the difference in pressure between the first and fourth points, and the second and third points, and generate electrical signals responsive to such differences.

20. An apparatus according to claim 19 including means coupled to the outputs of the differential pressure transducers for determining the density and velocity of the drilling fluid in accordance with the following equations (7) and (8):

$$p = P_1 + P_2 - P_3 - P_4/2g(h_2 + h_1) \qquad 7.$$

$$V = \sqrt{r(P_2 - P_1 - pgb)/pd} \qquad 8.$$

21. An apparatus according to claim 19 for also determining the viscosity of the drilling fluid including a fourth differential pressure transducer for determining the difference in pressure between the third and fourth points and generating an electrical signal proportional thereto.

22. An apparatus according to claim 21 including means coupled to the outputs of the four differential pressure transducers for determining the density, velocity and Fanning friction factor of the drilling fluid in accordance with the following equations (7), (8) and (9):

$$p = P_1 + P_2 - P_3 - P_4/2g(h_2 + h_1)$$
$$V = \sqrt{r(P_2 - P_1 - pgb)/pd}$$
$$f = (P_4 - P_3)d/2lpv^2$$

* * * * *